Patented Aug. 13, 1935

2,011,305

UNITED STATES PATENT OFFICE 2,011,305

METHOD FOR RECOVERY OF TIN AND LEAD FROM SCRAP MIXTURES CONTAINING SAME

Walton S. Smith, Colonia, N. J.

No Drawing. Application July 31, 1934, Serial No. 737,775

10 Claims. (Cl. 75—56)

This invention relates to the recovery of tin and lead; and it comprises a method of recovering tin and lead from alloys containing the two metals wherein the alloy is digested with a hot caustic alkali solution containing an oxidant, usually a nitrite, to prevent re-deposition of lead, digestion being continued until the lead and tin are oxidized, sufficient caustic alkali being present to keep the lead oxide in solution and prevent solution of the stannate formed from the tin oxide, the solution containing lead oxide is removed from the crystallized alkali stannate formed and tin and lead are separately recovered; the alkali stannate being sometimes dissolved in water and tin hydroxide precipitated by the use of nitrous gases, thereby forming a nitrite; all as more fully hereinafter set forth and as claimed.

The present invention is directed to the recovery of tin and lead from scrap mixtures containing both metals; and, more particularly, to the recovery of these metals from various secondary sources, as from scrap solder, bearing metals, terne plate scrap, etc. There are commercially available large quantities of metal carrying lead and tin, together with other metals, in amounts worth recovering. Large supplies are available of scrap solder, babbitt and other bearing metals, etc., and also of terne plate scrap; sheet steel coated with an alloy of lead and tin. No very good and economical method is known of treating these materials to recover the tin and lead separately, as well as other valuable metals, in pure and useful form.

In the prior art, babbitt, bearing metals, etc., have been treated with chlorine to chlorinate the various metals, tin chloride, which is a readily volatile substance being separated by distillation. No commercial use to any extent exists for the residual lead chloride, copper chloride and antimony chloride formed by the complete chlorination and these chlorides must be further processed to produce marketable products. In the prior art, tin scrap has been treated with chlorine, forming tin chloride and leaving steel. A similar separation of tin and steel has also been accomplished by dissolving the tin in a caustic alkali solution as a stannate; an oxidizing agent, such as sodium nitrate or chlorate or air being sometimes used. The alkali stannates are soluble in water in the absence of a large excess of caustic alkali.

These methods, as just described, are not available for the successful recovery of both tin and lead from terne plate scrap or the other plumbiferous and stanniferous scrap mentioned. Chlorination must be carried out under conditions in which the iron is not attacked and under these conditions, some of the tin and most of the lead remain unattacked. Caustic alkali solutions of the strength of those used in dissolving tin from tin plate on application to terne plate, do not give a good recovery of both tin and lead and the remaining steel retains enough of both to make it of little market value.

I have discovered that if a hot caustic alkali solution be used on tin lead alloys in the presence of a sufficiently powerful oxidant and in sufficient amount, both the lead and tin are oxidized and may be recovered in oxidized form. Other valuable non-ferrous metals present are also oxidized and can be separated as byproducts in the hereinafter described method. A caustic soda solution containing sodium nitrite I regard as best adapted for my purposes, although caustic potash and potassium nitrite can be used. With such a solution used hot on terne plate, both the lead and tin are removed; the former going into solution in the alkali, while the latter separates as crystalline stannate but little soluble in the alkaline liquid carrying the lead oxide in solution. After completion of the action, the liquid carrying lead in solution and the crystallized deposit of sodium stannate are separately treated.

In the case of terne plate treated by the hereinafter described process, substantially all the tin and the lead are removed; the remaining stripped steel being sufficiently pure to be charged back into an open hearth furnace or similarly used. In the application of the present method to solder and alloys, the tin and lead can be completely oxidized and the remaining metals are left in a recoverable form, either as oxides or as metals.

While I regard sodium nitrite as the best oxidant for my purposes, other oxidants may be employed; any oxidant which will prevent reprecipitation of lead in metallic form during the stripping operation. Sodium chromate and dichromate are applicable. The point is to have an oxidant present which will prevent the metallic tin re-reducing the lead going into alkaline solution. Dissolved nitrites or the nitrite ion prevent this re-reduction and the nitrites have some substantial advantages later pointed out.

In a commerical embodiment of the present invention treating lead-tin alloys, an alkaline bath is made up with caustic soda. An aqueous solution carrying 300 to 350 grams NaOH per liter is advantageous. Other caustic alkalies and other concentrations may be used. I have used caustic soda solutions as dilute as 50 grams per liter, though a stronger solution is more effective both in dissolving tin and lead and in precipitating sodium stannate. The particular dilution is not highly important as long as there is enough NaOH present to take all the PbO into solution, but strong solutions work more readily and do not involve waste since the NaOH is recycled. To this caustic alkali bath I add a little nitrite; using from 5 to 15 grams per liter of nitrite ions calculated as sodium nitrite. Sodium nitrite may be added as such or the nitrite ions produced in the solution by the introduction of nitrous gases. The stated concentration of nitrite is not critical; more or less may be used. But with less, action slows down and with greater concentration of nitrite, no substantial advantage is gained.

In using this bath, it is heated to a temperature somewhat below the boiling point, which may be about 105° to 115° C. In heating, the caustic liquor may be concentrated from a lower strength to that indicated. A temperature of about 90° C. gives good, thorough and quick attack on tin and lead. Actions go on, however, albeit more slowly, at temperatures as low as 80° C.

The scrap materials to be treated are advantageously held in a wire mesh or perforated plate container immersed in the hot caustic solution and allowed to remain until the tin and lead are completely removed. In the case of terne plate scrap, a residue of stripped steel is left and this may be washed and sent out of the system for utilization elsewhere. To strip terne plate scrap requires from one to six hours, while with solders and other alloys, the time required to oxidize the tin and the lead depends on the composition and surface of the alloy exposed. In the action, the lead is oxidized and remains dissolved in the solution while hot, up to a concentration of approximately 90 grams per liter. Any iron or steel remains substantially unattacked. The tin is dissolved from the scrap and converted to sodium stannate, which is practically insoluble in the caustic soda liquor holding the lead oxide in solution, and goes to the bottom of the bath, together with residual copper and antimony, or their insoluble oxides.

From time to time, portions of the bath containing the precipitates are removed and filtered hot in a plate and frame filter press or other press on which the cake may be readily washed with caustic soda solution in which the sodium stannate is insoluble. The filter cake contains the precipitated sodium stannate and the insoluble oxides and metals. The filtrate and washings contain the caustic alkali solution together with the lead oxide dissolved therein. The hot filtrate is run to a tank in which it is cooled. In the cooled solution, the solubility of lead oxide is reduced greatly and a large part of the oxide is precipitated and allowed to settle. The clear solution may be decanted and recycled, being returned to the dissolving bath. The precipitated lead oxide may be washed either by decantation or on a filter press, and after drying may either be used as such, or may be smelted to metallic lead in any convenient way. The lead oxide produced is of high purity.

The sodium stannate filter cake from the hot filtration may be washed on the filter press to remove some of the free alkali, and then dropped into a tank to which water is added. The sodium stannate being highly soluble in water, readily dissolves, leaving behind the insoluble oxides of copper, antimony and iron. Traces of lead, antimony or arsenic may be present in the sodium stannate solution and can be removed, either by precipitating as the sulfides, using an addition of sodium sulfide, or by immersing finely divided tin or tin plate scrap in the solution. Tin dissolves, precipitating practically quantitatively the lead, antimony, and arsenic present as metals in finely divided form. The purified sodium stannate solution may be used for preparing commercial sodium stannate by known methods, for which purpose it is well suited.

In an advantageous embodiment of my invention, however, the sodium stannate solution is treated so as to regain both tin oxide and a liquor containing nitrite which may be recycled. In so doing, sodium stannate solution is treated in a suitable absorption tower with nitrous fumes resulting from the oxidation of ammonia. These nitrous fumes produce a solution of alkali nitrite and a tin hydroxide precipitate. The precipitate is filtered from the solution and the filtrate added to the dissolving bath to supply the required nitrite ions. The decomposition of the alkali nitrite in the bath oxidizes the tin and lead and furnishes free alkali aiding in maintaining the alkali strength of the bath.

It will be seen that by this method no alkali is necessarily removed from the process except in the case where sodium stannate is marketed. There is, however, some loss due to spillage or retention of soda as an impurity in the products, etc. The fact that most of the soda stays in the system reduces the cost of operation. The filter cake of tin hydroxide, after washing and drying, may be used for the manufacture of tin oxide, smelted to metallic tin or used for any purpose requiring a pure tin hydrate.

The recoveries of tin and lead by this process from terne plate scrap run from 4 to 16 pounds tin and 12 to 60 pounds lead per ton of scrap, depending upon the thickness of the terne plating.

What I claim is:—

1. In the recovery of tin and lead from scrap material containing both, the process which comprises treating the scrap material with a strong hot caustic alkali solution of a strength sufficient to render alkali stannate substantially insoluble therein and containing a strong oxidizing agent, under conditions such that the tin is oxidized to form insoluble crystallized alkali stannate and the lead forms an oxide going into solution in the caustic alkali, and separating the alkaline lead solution from the crystallized stannate.

2. In the process of claim 1, employing a nitrite as the oxidizing agent.

3. In the process of claim 1, using alkali nitrite as an oxidizing material and treating the separated alkali stannate with nitrous gases to form tin hydroxide and to obtain such nitrite.

4. In the recovery of tin and lead from scrap material carrying both, the process which comprises digesting said scrap material in strong hot caustic soda solution in the presence of an oxidizing agent sufficiently powerful to prevent reduction of dissolved lead oxide by tin with reprecipitation of lead, thereby forming insoluble crystallized sodium stannate, filtering out the stannate, cooling the filtrate, precipitating lead oxide therefrom and recovering the lead oxide.

5. In the process of claim 4, effecting a separation of lead oxide by cooling the hot solution and returning the caustic soda mother liquor for treatment of more scrap.

6. The process of claim 1 wherein the caustic alkali solution is heated to temperatures above about 80° C., but below its boiling point.

7. The process of claim 1 followed by dissolving the crystallized stannate in water and purifying the solution by contacting with metallic tin.

8. The process of claim 1 followed by dissolving the crystallized stannate in water and precipitating impurities from the solution by addition of an alkali sulfide.

9. The process of claim 1 followed by chilling the lead solution recovering the lead oxide thereby precipitated and recycling the solution to the first step of the process.

10. The process of claim 1 followed by dissolving said crystallized stannate in water, precipitating and removing tin hydroxide from this solution by the addition of nitrous fumes, mixing the resulting nitrite-containing solution with the lye resulting from precipitation of lead oxide from said alkaline lead solution, and recycling the resulting mixed solution to the first step of the process.

WALTON S. SMITH.